United States Patent [19]
Liu et al.

[11] Patent Number: 5,972,409
[45] Date of Patent: Oct. 26, 1999

[54] SOLUBLE INSTANT COFFEE PREPARED FROM EXTRACT OBTAINED FROM GREEN COFFEE

[75] Inventors: Richard Tien-Szu Liu, Worthington, Ohio; Karl Loehmar, Korntal, Germany

[73] Assignee: Nestec S.A., Vevey, Switzerland

[21] Appl. No.: 08/875,836

[22] PCT Filed: Feb. 6, 1996

[86] PCT No.: PCT/IB96/00088

§ 371 Date: Aug. 6, 1997

§ 102(e) Date: Aug. 6, 1997

[87] PCT Pub. No.: WO96/24255

PCT Pub. Date: Aug. 15, 1996

[30] Foreign Application Priority Data

Feb. 8, 1995 [EP] European Pat. Off. .............. 95101652

[51] Int. Cl.$^6$ ................................ A23F 5/00; A23B 4/03
[52] U.S. Cl. ...................... 426/595; 426/432; 426/465; 426/466; 426/473
[58] Field of Search .................................. 426/594, 595, 426/432, 465, 466, 473

[56] References Cited

U.S. PATENT DOCUMENTS

| | | |
|---|---|---|
| 1,932,769 | 10/1933 | Copes . |
| 2,758,927 | 8/1956 | Chase . |
| 2,872,323 | 2/1959 | Perech . |
| 4,919,962 | 4/1990 | Arora et al. . |

FOREIGN PATENT DOCUMENTS

| | | |
|---|---|---|
| 460949 | 12/1913 | France . |
| 864412 | 4/1941 | France . |
| 52337 | 2/1944 | France . |
| 630153 | 10/1949 | United Kingdom . |
| 94-10852 | 5/1994 | WIPO . |

*Primary Examiner*—Anthony J. Weier
*Attorney, Agent, or Firm*—Vogt & O'Donnell, LLP

[57] ABSTRACT

A soluble coffee is prepared from ground green coffee which is extracted with water, the green extract obtained is dried and green powder obtained by drying is passed into and through a twin-screw extruder, and while the powder is passed through the extruder, the powder is heated in the extruder at a temperature of from 130° C. to 240° C. for up to 5 minutes to obtain a heat-caramelized extrudate product from the extruder, and that product is cooled and thereafter dried and ground to provide a powder-form product. Additionally, obtaining green extracts from low temperature and high temperature split extraction enables separate processing of low and high temperature extracted extracts, and low temperature extracted extracts may be heated in an extruder at a temperature of from 180° C. to 240° C. and high temperature extracted extracts may be heated in an extruder at a temperature of from 130° C. to 180° C. which enables obtaining a balanced product. Further, in the context of use of low and high temperature extraction, an extract may be obtained from roast and ground coffee by low temperature extraction and then the spent grounds and green coffee may be extracted by high temperature extraction, and the extracts may be treated as set forth above.

26 Claims, 6 Drawing Sheets

SOLUBLE INSTANT COFFEE PREPARED FROM EXTRACT OBTAINED FROM GREEN COFFEE

CROSS REFERENCE TO RELATED APPLICATION

This Application is a National Stage Application of PCT International Application PCT/IB96/00088 filed Feb. 6, 1996.

BACKGROUND OF THE INVENTION

The invention relates to a soluble instant coffee and a process for its preparation.

Soluble coffee has been available on the market for over half a century. The production of such a soluble (instant) coffee has been known in the prior art. The green coffee was roasted and finely ground. Water was used to extract the soluble solid from roasted and ground coffee in a train of percolators. The extract was concentrated by evaporation or freeze concentration to a high concentration and was then spray dried or freeze-dried into powder form. During this operation, aroma flavor-components loss occurred in every step starting at the roasting process. This is due to the fact that the aroma is very volatile and is extremely unstable to heat, oxygen and light, which has been known in the prior art which provides disclosure of efforts and technologies employed in the soluble coffee industry to reduce aroma loss and to recover the aroma during soluble coffee manufacture to improve and to produce a better instant coffee quality. However, to date, there still is a great quality gap between coffee brew from roast and ground and instant coffee.

In the context of the present invention, a technique wherein green coffee first is extracted and a green powder obtained therefrom is heat treated is known from the disclosures of U.S. Pat. Nos. 2,758,927 and 1,932,769 already known in FR 52 337, FR 864 412, U.S. Pat. No. 2,872,323, FR 460 949, U.S. Pat. No. 2,758,927, U.S. Pat. No. 1,932, 769 and GB 630 153.

SUMMARY OF THE INVENTION

The drawbacks are that the roasting of the green powder is very long, not homogeneous, and is carried out batchwise, which makes these techniques very expensive. Furthermore, if the process occurs in an oven or a mixer or a heating plate, the green powder burns.

The present invention has an objective to provide processing techniques to produce a high quality soluble coffee product which is close to the quality of coffee brew obtained from roast and ground coffee wherein green coffee is extracted with water, the green extract is dried to obtain a powder and the powder is heated at a temperature of from 130° C. to 240° C. to obtain a heat-caramelised product which then is cooled and ground, and the present invention provides a soluble caramelised instant coffee extract powder having a gas chromatogram (GC) profile for volatile aroma compounds according to FIG. 1c. The GC of FIG. 1a is one obtained for a classical roast and ground coffee and the GC of FIG. 1b. is for classical instant coffee powder.

From a comparison between FIGS. 1a, 1b and 1c, it is clear that the instant powder obtained according to the invention has really the closest profile to a classical roast and ground coffee, and this is desired for avoiding to all the losses occurring during a classical processing of instant powder. The way for obtaining the GC is described below in reference with the drawing figures.

DETAILED DESCRIPTION OF THE INVENTION

The instant coffee according to the invention has an average particle size which is not critical, but for convenience reasons, it is of 0.5 to 3 mm. This coffee has a water content of 1 to 5%.

In a particular embodiment, the instant powder contains from 0 to 5% of oil, in order to have an aroma and flavor carrier from the caramelized product. The oil is taken from the group consisting of coffee oil and other vegetable oils. The powder according to the invention can be used per se, but can be also used in a mixture with a compound chosen from the group consisting of an instant coffee, milk powder, sugar and soluble powder made from chicory roots.

The process of the invention provides for the extraction of the soluble solids from the ground green coffee beans, concentration and spray drying to powder form. The powder is then caramelized to a desirable coloring degree. This will result in an improved aroma flavour, more reddish color and clear cup of coffee. The extraction techniques used in this invention include a single stream train of percolators in countercurrent of water to green coffee particles flow. It also uses the split extraction technique i.e., a low temperature extraction train of percolators which solubilize the smaller and easier water-soluble substances from the green coffee particles. The remaining water-soluble solid is extracted in the higher temperature extraction train of percolators. This split extraction scheme is in a continuous process. The advantage of this separate extraction technique is to produce two portions of soluble solids from the green coffee beans and to caramelize them separately. This separate caramelizing technique enables to caramelize these two different portions with different energy input so as to avoid over-caramelizing one portion and under caramelizing the other portion. The overcaramelized portion results in burnt note and cereal flavor while the undercaramelized portion will have a greenish and beany taste and have a yellowish turbid cup when reconstituted with water. Therefore this separate caramelizing technique provides a well balanced aromatic/flavour and in-cup soluble coffee appearance when combining the two caramelized portions together.

Oil addition to the concentrated green coffee extract and dispersion of this added oil to very fine particles prior to spray-dry to produce the powder for caramelization are two facts which result in a better aroma/flavour retention during caramelization and to prevent oil slicks in the cup after the powder is reconstituted with water.

Concerning the extraction technique, a further possibility is slurry extraction as known in the prior art.

According to a further embodiment of the invention, the ground green beans are steamed.

Only part of the aroma and flavour precursors is extracted under normal conditions by the extraction of the green coffee beans with water. The steaming of the green beans is applied either before or during extraction in order to increase the yield of soluble solids from coffee. This method leads to a complete extraction of the precursors and an extensive hydrolysis and solubilisation of the coffee carbohydrates and proteins.

The caramelization of the green powder occurs in a twin-screw extruder or in any suitable equipment for caramelizing powder. The caramelization is made preferably at a temperature of 130 to 240° C. during up to 5 minutes, preferably during up to 2 minutes.

The green coffee powders from the single stream extraction, from the low temperature split extraction and from the slurry extraction are caramelized at a temperature of 180 to 240° C., the green coffee powders from the high temperature split extraction at a temperature of 130 to 180° C.

The caramelization can be performed at 1–30 bars pressure, preferably under 10 bars. When the caramelization is completed, the caramelized products are cooled immediately to stop the chemical reaction and to preserve the volatile aroma/flavor components, which are produced during caramelization, from escaping. Also, during caramelization, $CO_2$ and other gases are produced, it is imperative to incorporate these gases into the melted glassy product prior to exit from the nozzle of the extruder. This will produce a porous extrudate which will result in a product with proper density, and most importantly, it will have a much faster dissolution when the powder is reconstituted with hot water.

Several types of cooling equipment for cooling the caramelized products can be used such as, a belt conveyer, tumbler, or fluidized bed, and it can be cooled with a liquid nitrogen spray or be dosed with powdered dry ice ($CO_2$).

After the caramelized extrudate is cooled, it will be particulated to an appropriate particle size of 0.5–3 mm.

Several grinders, such as a hammer mill, roller mill and Fitz Mill, can be used.

Instead of processing the green coffee beans in their totality, it is also possible to treat by a classical way a part (comprised between 10 and 95%) of the beans, i.e. roasting and grinding, the rest of the beans (between 5 and 90%) being only ground. Both powders are then extracted, concentrated, dried and extruded together according to the invention. This embodiment is the object of Example 5.

According to a further embodiment, it is possible to treat by a classical way a part (comprised between 70 and 95%) of the beans, i.e. roasting, grinding and extraction (by the split extraction technique) at a low temperature extraction portion and said portion is subjected to aroma/flavor recovery/reincorporation steps, concentration and drying to produce an aroma and flavor enriched portion of the conventional soluble powder (instant coffee) as stated in the prior art. The spent coffee (insoluble portion at the low temperature extraction step) is then joined with the ground green coffee (between 5 to 30% of the total coffee) for the classical way of high temperature extraction. The extract is then concentrated and dried to a powder. This powder is then caramelized with a twin screw extruder. Both the aroma enriched powder from the low temperature extraction portion and the caramelized powder are then mixed and ready for the consumer. This possibility is the object of Example 6.

The description is made now in relation with the drawings.

BRIEF DESCRIPTION OF THE DRAWING FIGURES

FIG. 1a represents a GC of a classical roast and ground coffee related to the volatile aroma compounds.

Figure 1B:
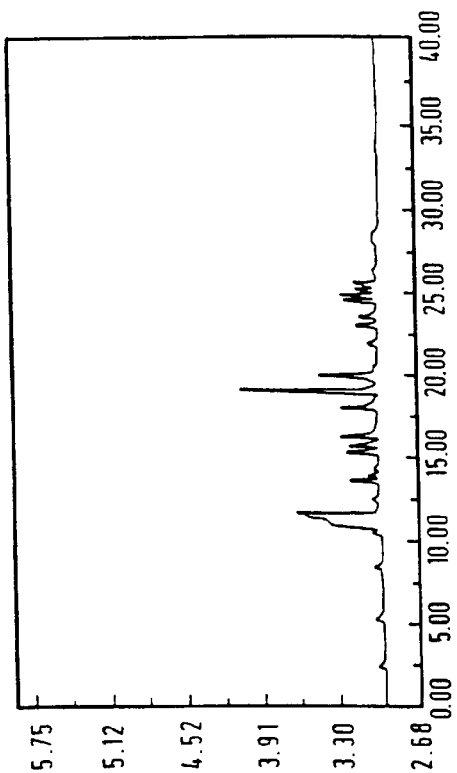
FIG. 1b represents the same GC but for classical instant powder.
Figure 1A:
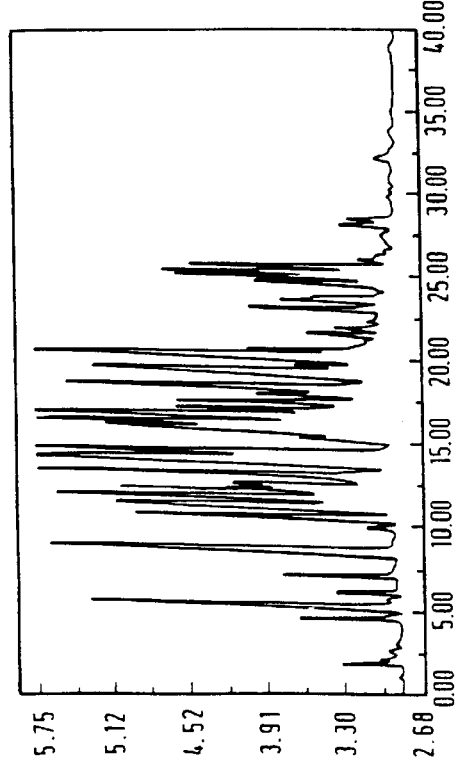
FIGS. 1a to 3d are gas chromatograms of volatile aromas of different types of coffee.
Figure 1C:
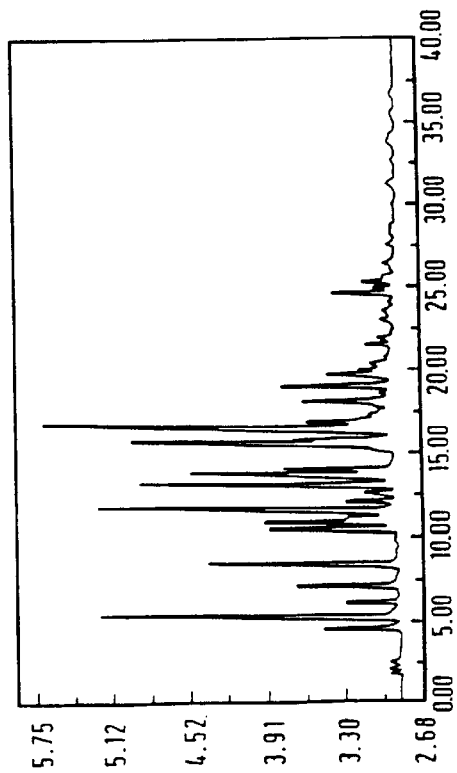

FIG. 1c the GC of a powder according to the invention.

Figure 4:
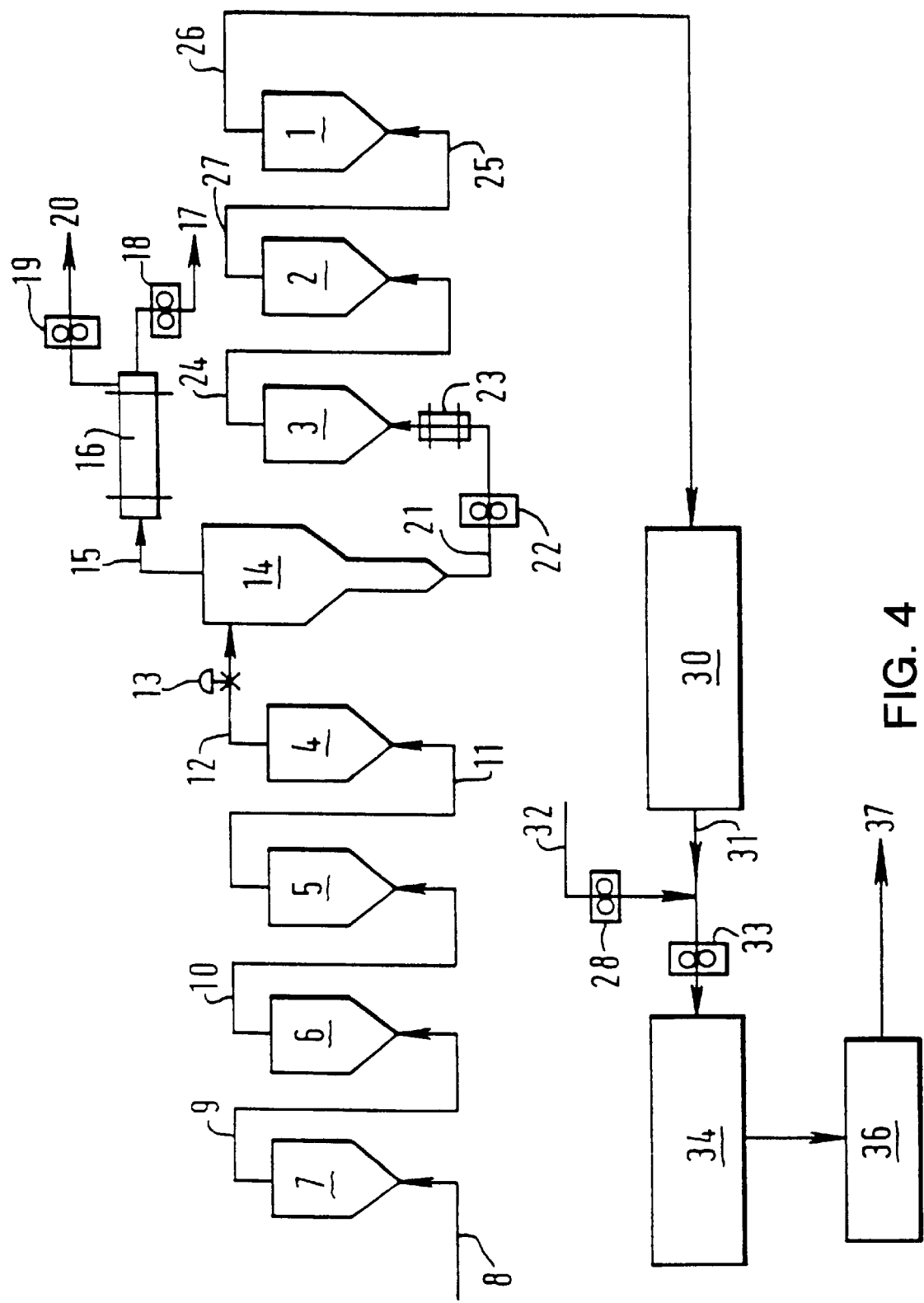

FIG. 4 is a schematic view of the single stream extraction of green coffee.

Figure 5A:
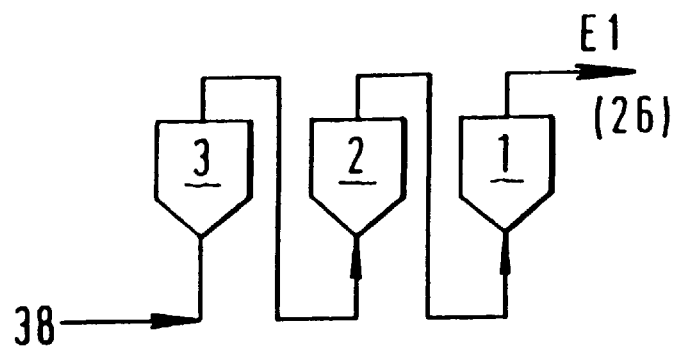
Figure 5B:
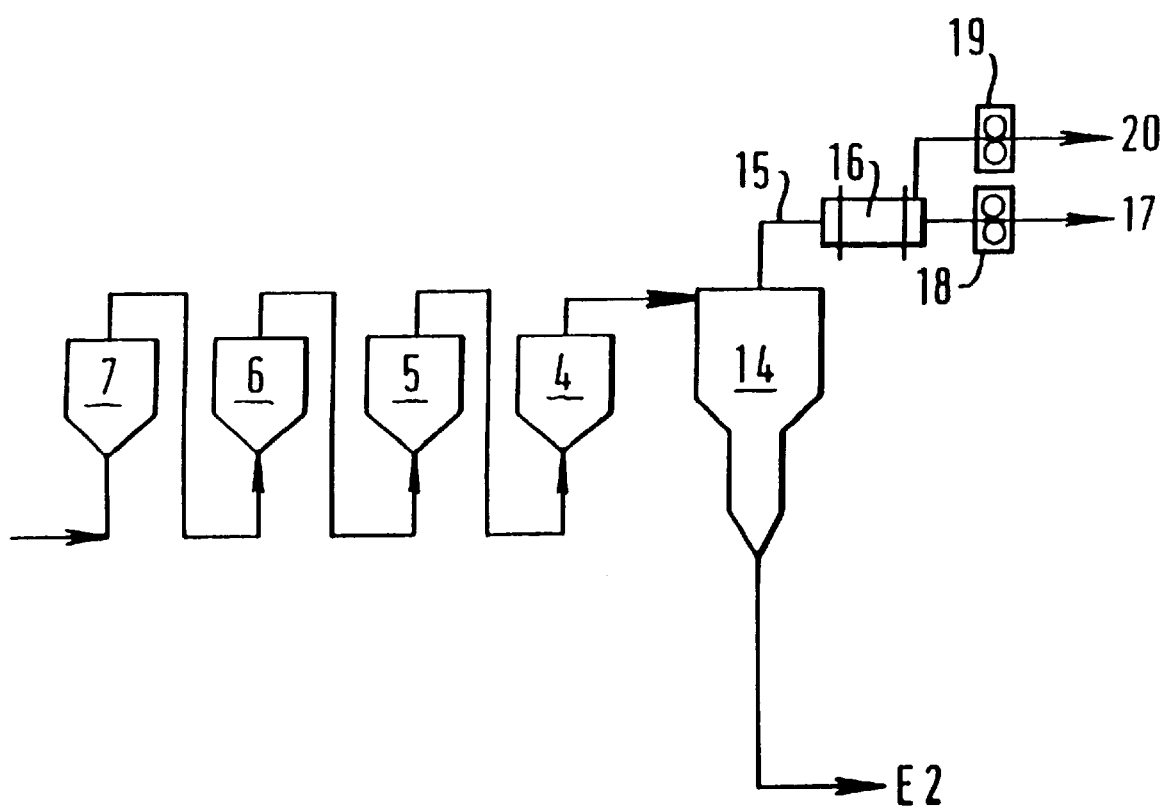

FIGS. 5a and 5b are schematic views of the split extraction of green coffee.

Figure 6:
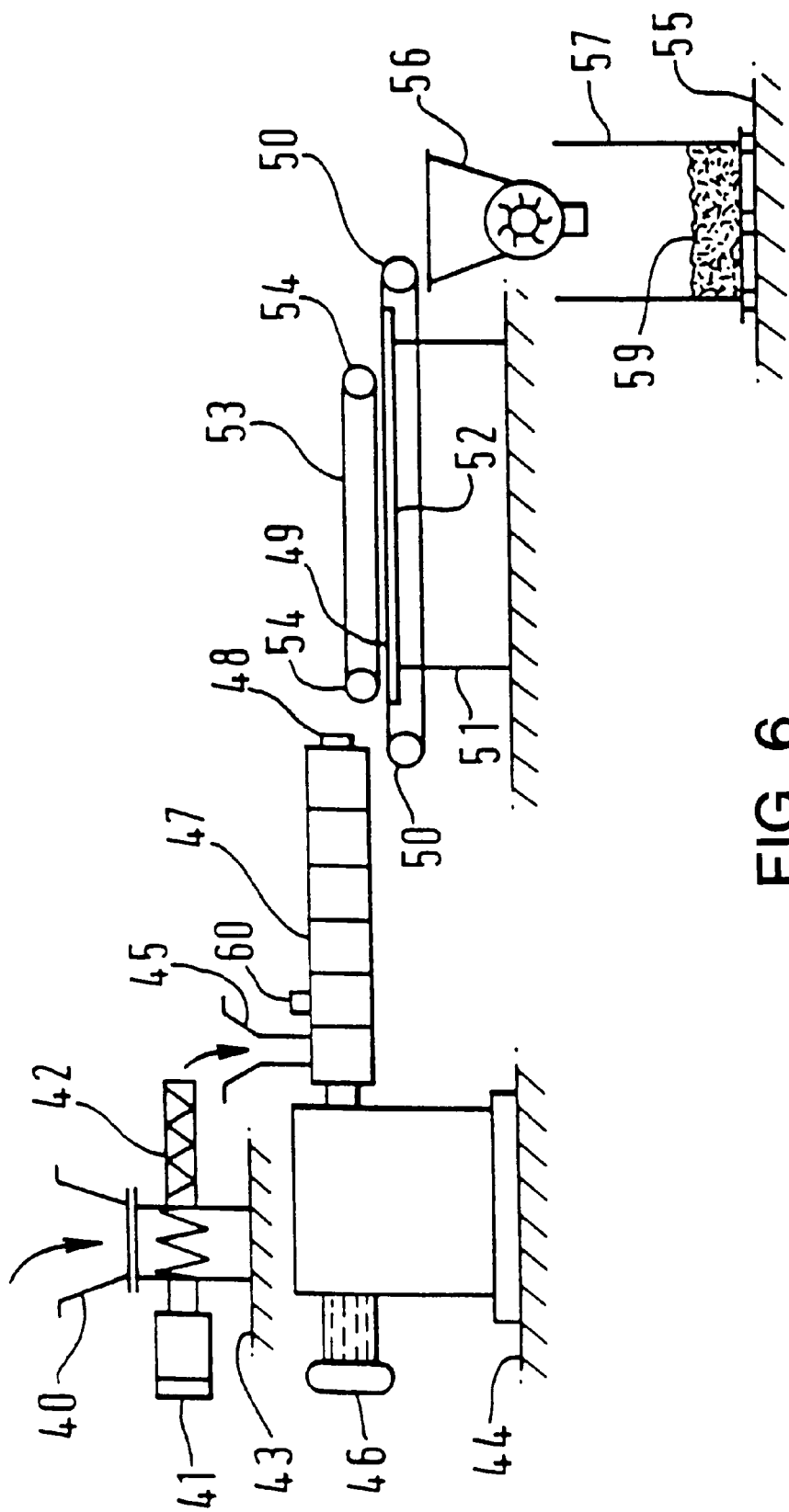

FIG. 6 is a schematic view of the caramelizing of the extracted green coffee powder.

DETAILED DESCRIPTION OF THE DRAWING FIGURES AND OF OPERATION

Figure 2A:
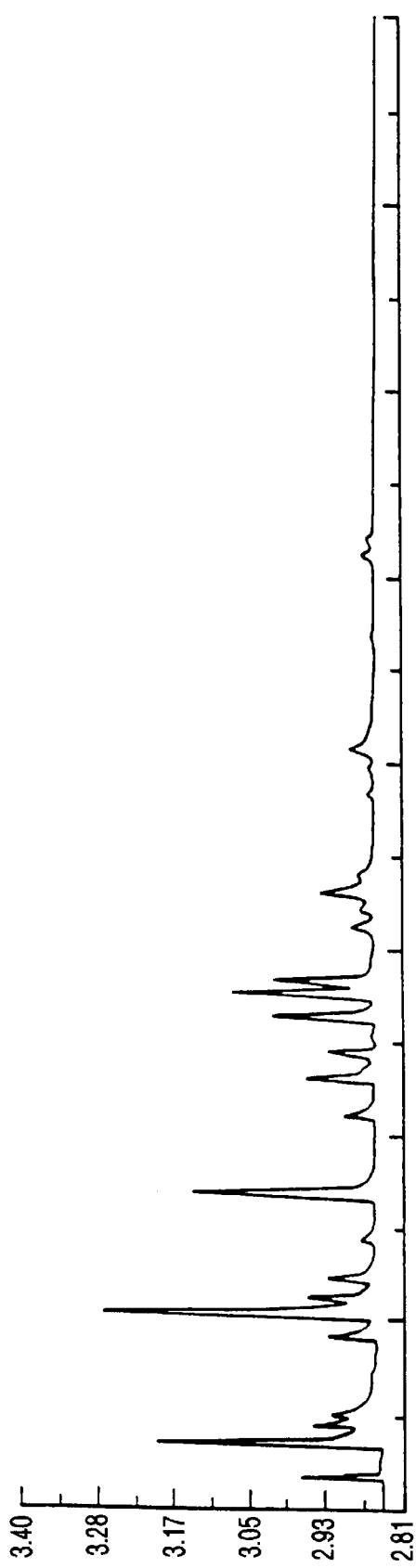
Figure 2B:
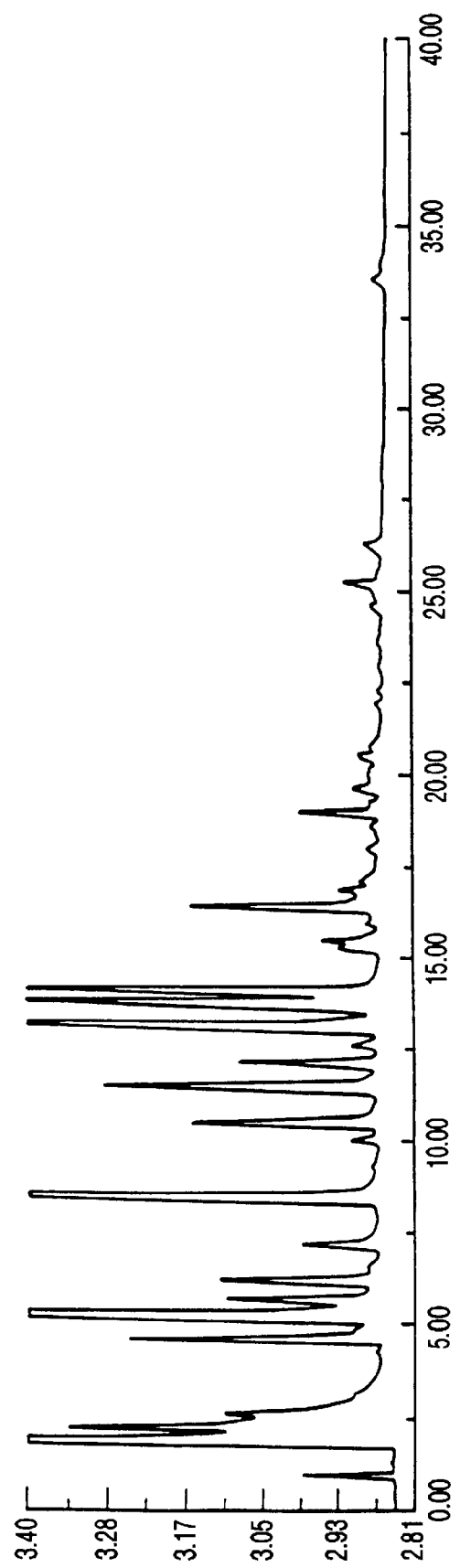
Figure 3A:
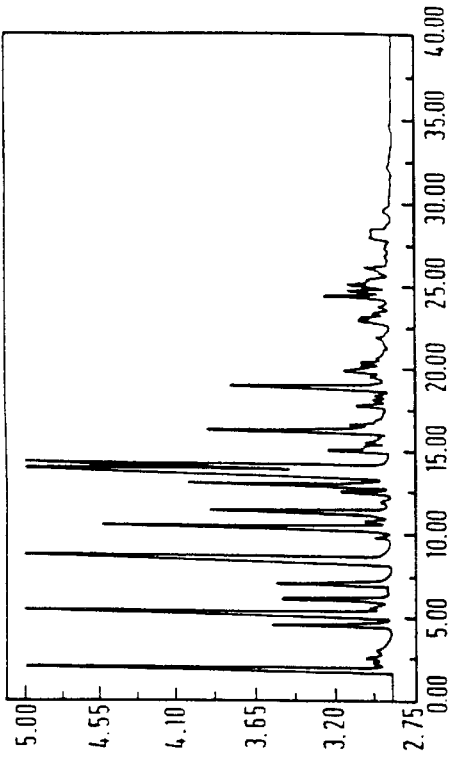
Figure 3B:
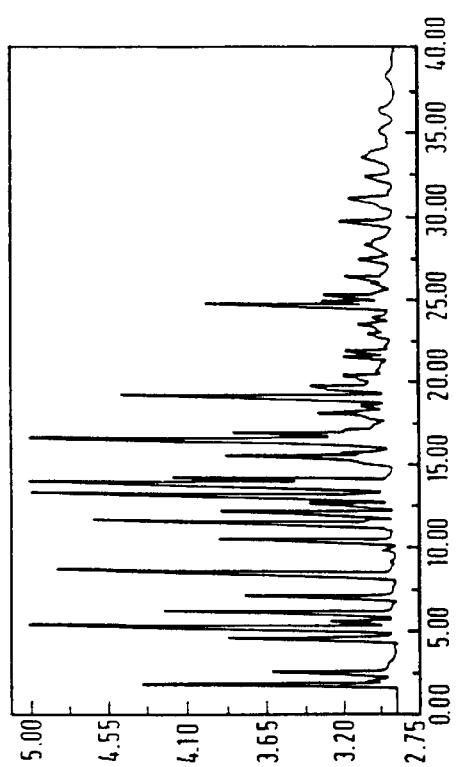
Figure 3C:
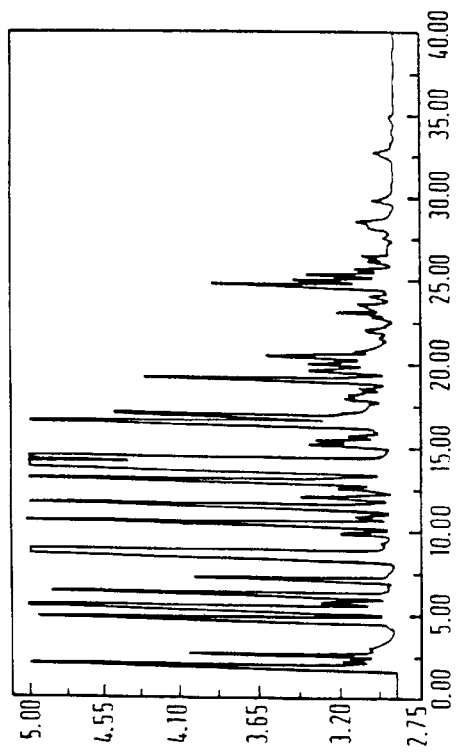
Figure 3D:
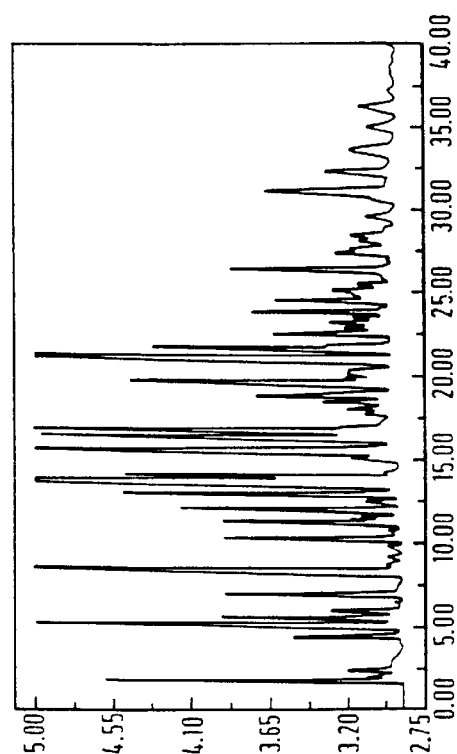

The GC chromatograms shown in FIGS. 1 to 3 are typically obtained by the following general procedure.

The samples are sealed in a closed container. A 10 $\mu$l syringe is used to take the vapor from the head-space of the sealed container. This vapor is then injected into a GC injection port. A DB wax capillary column programmed 20 to 180° C., and a FID (Flame Ionization Detector) are used to detect peaks of the components exiting the column. The resulting GC chromatograms are shown in FIGS. 1 to 3.

In FIG. 1, chromatograms of dry products of conventional roasted and ground coffee (1a), conventional instant coffee (1b) and the caramelized product (1c) are shown.

FIG. 2 shows chromatograms the conventional roasted and ground coffee (2a) and the caramelized coffee (2b) (the vapor is taken directly from the caramelizing reactor prior to opening).

FIG. 3 shows chromatograms of brew product and of powder products which are reconstituted with hot water to 1% solid concentration and sealed in a closed container. FIGS. 3a, 3b, and 3c show chromatograms of the vapor from the headspace of the brew coffee (3a), conventional instant (3b), the caramelized low temperature extract portion product (3c) and the caramelized coffee with the combination of the cold and hot temperature extraction portions (3d).

FIG. 1 indicates that the caramelized sample (1c) displayed a greater similarity to the roast and ground sample (1a) in both composition and strength, as opposed to the weaker conventional instant coffee sample (1b). Even higher levels of aroma and volatiles were observed with GC analysis of syringe samples of headspace in the sealed reactor following the caramelizing pressure reacting (see FIG. 2b). Two caramelized products (low temperature extraction portion, FIG. 3c) and the combination of the low and high temperature extraction portions caramelized product (FIG. 3d) and a current production the conventional instant powder (3b) are reconstituted with hot water, and GC analysis of these samples, as well as a brew (3a) were conducted for comparison. As can be seen from FIGS. 3a, 3b and 3c, the resulting chromatogram illustrated the great difference between the instant and the caramelized samples and the close similarity between the brew and the caramelized samples.

In relation with FIG. 4, a mixture of coffee beans, i.e., 70% Robusta and 30% Arabica (weight basis) are ground with a roller mill to an average particle size from 2.0 to 4.0 mm. The ground green coffee was placed in a train of percolators. Hot water (8) at 160–180° C. is pumped to the bottom of the most exhausted extracted percolator (7). The solution (9) from the exit of this percolator (7) is continued to flow into the bottom of the next most exhausted extracted percolator (6). This direction of flow (10) of extraction is continued to proceed into percolator (5), then the extract (12) from the exit of the percolator (4) through a pressure controlling valve (13) is flashed into a separator (14) to remove the undesired compounds from the high temperature extraction of the green coffee particles. The vapor (15) separated from this flashing stream is condensed in a heat exchanger (16). The condensate (17) is then removed by a pump (18). The separator is operated between 30 cm mercurial vacuum by a vacuum pump (19) to one or less atmospheric pressure. The noncondensible gas (20) is removed by the vacuum pump (19) to obtain a necessary vacuum in the separator (14). The cooled solution (21) by vaporization of water is pumped with a pump (22) through a heat exchanger (23) to heat to a temperature between (110–125° C.) prior to enter into the bottom of the other train of percolators (3,2,1) which are operated at a lower temperature of between 100–125° C. The solution (27) exiting from the top of the percolator (2) is entered into the freshly loaded percolator (1) containing ground green coffee particles. It is of imperative importance that the loading of the ground green coffee should be about half the percolator in volume, since the expansion nature of the green coffee and to avoid excess pressure occurred during the extraction.

After passing predetermined amount of hot water to the most exhausted extracted percolator (7), the hot water is entered into the percolator (6) which will be the percolator (7) in the new extracting train. The content of the exhausted extracted green coffee in the percolator is blown to a spent coffee receiver. The empty percolator is reloaded with the freshly ground green coffee particles. The loaded fresh ground coffee is placed in the cold extraction train as is indicated in FIG. 4 percolator (1), and the percolator (3) is moved to hot extraction train as percolator (4).

The yield of the soluble solid from the green coffee is between 40–70%. The yield which is defined as the soluble solid extracted from the green coffee particles is expressed in percent, i.e. 50% yield is 50 parts of soluble solid extracted from 100 parts of green coffee beans. The yield of the soluble solid from the green coffee depends on many processing parameters such as temperature of the hot extraction train percolators (7–4), the ratio of water to green coffee, the number of the percolators in the extraction train, time of extraction and some high temperature steam hydrolysis steps between the cold extraction train of percolators (1 to 3) and the hot extraction trains of percolators (4–7).

The yield of soluble solid from green coffee in this investigation is very important. On the one hand, it is ultimately important to exhaust extracting the precursor from the green coffee and furthermore, the higher yield is also economically beneficial. However, too high a yield may dilute the quality of the final products.

The solution (26) which contains the soluble green coffee matter is passed to the conventional evaporators (30) to concentrate the solution to 50 to 55 percent solid content. Half a percent to 5% oil (32) based on solid content, W/W) is added by a pump (28) to this concentrated stream (31) and pumped by a pump (33) to a high pressure homogenizer (34) to disperse the added oil to very fine particles of less than one micrometer prior to spray drying (36). The homogenization step is important since large oil droplets will cause undesirable cup appearance upon reconstitution of product with water. A green powder (37) ready for caramelizing is obtained.

Another alternative of extraction scheme used in this invention is showed in FIG. 5. As was stated in the prior art for roasted and ground coffee extraction processing, a similar technique can be applied to the green coffee, i.e., the most water-soluble matter, which is easily extracted from the cold extraction percolators train, are mostly smaller molecular weight compounds, such as sugars, amino acids, trigonelline and other organic compounds. These components are believed to be the precursors of the aroma and flavour components during the caramelization process. Therefore, this portion of "cold" water extracted matter will produce a aroma/flavor enriched coffee product. This product may be suitable for its special applications.

In addition, this portion of small molecular weight substances behaves very differently from the large molecular weight substance extracted from the high temperature percolator train extraction. This will be described in the next section. It is, therefore, very important in this invention to have this type of split extraction scheme.

FIGS. 5 (A) shows the cold extraction percolator train and 5 (B) demonstrates the hot extraction percolator train. Instead of using the solution from the hot extraction train after separator 14, hot water (38) of temperature ranged from 110 to 130° C. is entered the percolator 3. The extraction and its downstream process is the same as was described earlier to produce a E 1 portion (low temperature extraction) of soluble green coffee powder.

The E 2 extraction portion (high temperature) also is the same as described earlier except the solution after the separation is sent directly to evaporator and goes on to the high pressure homogenizer and spray dryer to produce the E 2 portion of the green coffee powder. The yield of E 1 is between 20–30% while that of E 2 is between 30–40%. Again, the yield of each of these two portions depend on the extraction parameters of temperature, water to green coffee ratio, number of percolators in the extraction train and time of the green coffee remaining in the extraction train.

FIG. 6 shows a schematic diagram of the caramelization, cooling and particulating system. The transport of the coffee powder from the hopper (40) to the extruder (47) for caramelization in FIG. 6 occurs through the dosing unit (42), which is driven by motor (41). The dosing unit (42) is disposed on the ground (43) and the extruder (47) below on the ground (55).

From the dosing unit (42), the powder is delivered through hopper (45) into the first segment of extruder (47). A twin-screw extruder is used with eight segments, which is driven by a motor (46). The segments are heated with heated oil which was circulated and heated by an external heating system (not shown) to the desired temperature of the twin screw barrels. A venting port (60) is located at the segment next to the feeding segment to vent the air and steam generated in this heated segment.

A plastification of the coffee powder is obtained in the heating zone and the pressure increased due to the formation of $CO_2$. An homogenous, caramelized extract is discharged at the exiting port which is fitted with two dies (48) attached to the end of the extruder.

After exiting the nozzle (48), the hot expanded viscous extrudate falls on a strengthened belt (49), which is running between two rolls (50). The belt stood with frame (51) on the ground (44) and presents a cooling chamber (52) for cooling the extrudate at 15° C. The caramelized extract is pressed on the belt (49) for obtaining a thin layer by another belt (53) driven by two rollers (54). In order to rapidly cool the extrudate, a blast of cooling air (not shown) was applied to the other side of this belt. The caramelized product is separated from the belt (49) and ground in a mill (56). The powder (59) falls in the container (57), which stood on the ground (55).

If a constant temperature profile of the segments of the extruder is used, the degree of caramelization of the coffee extract depends on the flow rate. A darker coffee powder is obtained by a smaller flow rate and a lighter color by higher flow rate.

Partial soluble solids, gained from coffee beans at extraction temperatures under 100° C. are caramelized in the range of 220 to 240° C. Partial soluble solids gained at extraction temperatures above 100° C. are caramelized in the range of 130 to 180° C.

EXAMPLES

The following examples further illustrate and explain the present invention.

Example 1

Soluble green coffee extract obtained from single stream extraction technique are divided into two portions. Portion A is spray-dried while the B portion is added with 5% oil and is homogenized at a high pressure of 100 bars in a homogenizer prior to spray drying. The moisture content of A powder is 3.0% while that of the B powder is 3.2%. Thirty kg of each powder is fed to a twin-screw cooking extruder (Werner u. Pfleiderer, model CONTINUA 58, with 8 barrels). The conditions of the caramelization in the extruder are the same for both powders, that is, a feed rate of 50 kg/h, screw speed of 200 rpm, and barrel temperature of 220° C. during 40 sec.

The extrudate from powder A is not expanded and some vapors are escaping out at the nozzle from the extrudate.

The extrudate is cooled in the cooling belt. It is solidified and cooled in about 1 minute. The cooled extrudate is broken with a rolling bar and ground in a mill to an average particle size of 2 mm.

The extrudate from powder B which contains 5% oil is well expanded and flows smoothly from the nozzle to the cooling belt. There is no vapor appearing at the exit of the nozzle.

The two caramelized powders A and B are reconstituted with boiling water and are evaluated for their quality. The result is described as follows:

Sample A: sharp, (slightly cereal flavor and lack of aromatic)

Sample B: smooth, balanced aroma and flavor.

Example 2

Fifty kg of powders C and D obtained from split extraction technique as described in FIG. 5 are used for the caramelization with Werner u. Pfleiderer twin-screw cooking extruder. Powder C is obtained from low temperature extraction fraction and 5% coffee oil was finely dispersed into the concentrated extract prior to spray drying. Powder D is obtained from the high temperature extraction fraction and is concentrated and spray dried without addition of oil. The caramelising conditions for the powders are the same as for the preceding example, except for powder D, where the feed rate is 14 kg/h and the barrel temperature is 130° C. and the duration is caramelising of 25 sec.

Similar to sample B in Example 1, the Powder C obtained from the caramelizing operation is smooth, the extrudate is well expanded with vapor and there is no vapor separate at the nozzle from the extrudate.

The condition for caramelising the powder D is different from that of powder C. Moreover, addition of water at barrel No. 3 of the extruder is needed in order to have a smooth operation. Furthermore, unlike powders C and A+B in Example 1, a high temperature is maintained at in least two barrels of the extruder so as to flash the undesirable vapors from the extrudate.

In both cases, the extrudate is cooled on the cooling belt, and is around in the hammer mill to an average particle size of 2.0 mm.

The samples are reconstituted with boiling water and are taste tested separately. The samples C & D are prepared separately and also proportionally combined and are tested with sample B of Example 1. The results of the taste tests are as follows:

| | |
|---|---|
| Sample C | aromatic, slightly unbalanced |
| Sample D | flat, slight acidy and body |
| Sample C + D | aromatic, balance flavor better than sample B |
| Sample B | balanced flavor. |

Example 3

A dry blend consisting of 50% each of soluble extract powder from green coffee and green chicory is prepared. The soluble coffee powder obtained by the single stream extraction is used for this trial. The soluble chicory powder is produced from dried chicory by extracting the material and by spray drying the liquid extract. The same extruder with 8 segments is used. The feed rate of the powder mixture to the extruder amounts to 60 kg/h. The barrel temperatures and the further processing of the extract powders are the same as stated in Example 1.

Example 4

A dry blend consists of 10% soluble green coffee powder (from Example 1) to 90% of conventional soluble coffee powder (instant) which was manufactured in a conventional means, as stated in the prior art. Robusta coffee was used for both of the above mentioned soluble coffee powders. The single stream extraction technique is used in both cases. The yield of the green soluble coffee was 60% while that of the conventional soluble coffee (instant) was 52%. They were processed to produce powders as stated in the prior art. 50 kg of the blended powders were caramelized. The caramelization conditions are the same as stated in Example 1. The caramelized product was tested against the 100% instant coffee of the same green coffee as the raw material. The taste panel preferred the caramelized product as having more acidity, less harsh flavor, more and much stronger, brew-like, while the 100% instant coffee was described as harsh, rough, and dry (lack of acidity).

Furthermore, the caramelized coffee reduced its dosage of two third and tasted against the same control which has full strength. The taste panel found that this product has a similar cup strength but is better in quality.

The caramelized coffee is used to prepare Café au Lait with 66% of the coffee dosage (compared to regular instant) and tasted with the control sample which is made with regular instant coffee. Again, the taste panel preferred the caramelized coffee as more coffee-like than the control.

Example 5

This example illustrated that the single-stream blended powders shown in Example 4 can be obtained by co-extraction of roasted coffee and green coffee beans. Robusta coffee is used. The roasting, extraction, concentration and drying steps of the soluble powder manufacturing processes are the same as stated in the prior art.

The conditions of the caramelization of the powder are the same as described in Example 1. The caramelized sample was tasted with a control sample which was the conventional instant coffee with the same raw material (Robusta beans).

The taste panel preferred the caramelized sample to the control sample for its more acidity, milder, stronger cup strength and more brew-like cup quality.

Example 6

This example shows another alternative to produce a mixture of green and roasted soluble coffee powders for further caramelization by a twin-screw extruder.

In this version, a split extraction technique for the roast and ground part was used. The roasted and ground coffee which contains 90% of the total green coffee beans (Robusta beans) was extracted with a low temperature extraction column train and was processed to produce an aroma/flavor enriched coffee powder. The yield of this fraction was 21% (of the 90% coffee).

The ground green coffee (10% of the total) was mixed with the spend extracted roast and ground coffee from the low temperature extraction of the split extraction technique. The mixture was loaded in a train of extraction columns and followed the high temperature extraction of the split stream extraction technique. The yield of this stream was 35% (based on total coffee). This extracted solution was processed to produce a powder of a mixture of green and roasted coffee. Fifty kg of this mixture of soluble coffee powder was then caramelized with a twin screw extruder. The conditions of the caramelization were the same as stated in Example 2 powder D except the the temperature profile of the extruder was 210–200° C.

The flavor enriched powder from the low temperature extracted fraction was then combined with this caramelized product. The mixture was tasted with the samples from Example 2. The taste panel clearly selected this sample as the best balanced and most brew-like, and the caramelized coffee from Example 2 was second, while the control (also from Example 2) was the last.

We claim:

1. A process for preparing soluble coffee comprising extracting ground green coffee with water to obtain a green extract, drying the green extract to obtain a green powder, passing the green powder into and through a twin-screw extruder and while passing the powder through the extruder, heating the powder in the extruder at a temperature of from 130° C. to 240° C. for up to 5 minutes to obtain a heat-caramelised extrudate product from the extruder, cooling the extrudate product to obtain a cooled product and grinding the cooled product to obtain a powder-form product.

2. A process according to claim 1 further comprising, prior to drying the extract, adding an oil to the extract.

3. A process according to claim 2 further comprising, after adding the oil to the extract, homogenizing the extract and oil so that the oil in the extract has a particle size of less than one micrometer.

4. A process according to claim 1 or 2 or 3 wherein the powder is heated in the extruder for up to 2 minutes.

5. A process according to claim 1 wherein the extrudate product is cooled upon exit from the extruder to preserve aroma and flavor components in the extrudate product.

6. A process according to claim 1 further comprising, prior to extracting the ground green coffee, steaming the ground green coffee.

7. A process according to claim 1 further comprising steaming green coffee beans to obtain steamed green coffee and wherein the ground green coffee extracted comprises the steamed green coffee.

8. A process according to claim 1 wherein the ground green coffee is extracted by an extraction method selected from the group consisting of single stream extraction, of slurry extraction and of low temperature and high temperature split extraction.

9. A process according to claim 1 wherein the ground green coffee is extracted by an extraction method selected from the group consisting of single stream extraction and slurry extraction and wherein the green powder is heated in the extruder at a temperature of from 180° C. to 240° C.

10. A process according to claim 1 wherein the ground green coffee is extracted by low temperature and high temperature split extraction and the extract is a low temperature extracted extract and the powder is heated in the extruder at a temperature of from 180° C. to 240° C. to obtain the extrudate product for cooling.

11. A process according to claim 10 further comprising obtaining a high temperature extracted extract from the split extraction to obtain a second extract, drying the second extract to obtain a second green powder, passing the second green powder into and through a twin-screw extruder and while passing the second powder through the extruder, heating the second powder in the extruder at a temperature of from 130° C. to 180° C. for up to 5 minutes to obtain a second heat-caramelised extrudate product from the extruder, cooling the second extrudate product to obtain a second cooled product and grinding the second cooled product to obtain a powder-form product.

12. A process according to claim 11 wherein the extrudate product obtained from the low temperature extracted extract is a first extrudate product and the first and second extrudate products are separately obtained and separately cooled.

13. A process according to claim 12 further comprising, after cooling, combining the first and second extrudate products and then grinding the products combined.

14. A process according to claim 11 wherein the low temperature extracted extract is obtained by extracting the green coffee at a temperature of between 100° C. and 125° C. and the high temperature extracted extract is obtained by extracting at a temperature of from 160° C. to 180° C.

15. A process according to claim 1 further comprising extracting a roast and ground coffee to obtain an extract, drying the roast and ground extract to obtain a powder and passing the roast and ground extract powder together with the green powder into and through the extruder to obtain the extrudate product.

16. A process for preparing a soluble coffee comprising extracting roast and ground coffee with low temperature extraction to obtain a roast and ground extract and spent grounds, and processing the roast and ground extract to obtain a dried roast and ground extract powder-form product, and extracting ground green coffee together with the spent grounds with high temperature extraction to obtain a further extract, drying the further extract to obtain a further powder, passing the further powder into and through a twin-screw extruder and heating the powder in the extruder at a temperature of from 130° C. to 240° C. for up to 5 minutes to obtain a heat-caramalized extrudate product from the extruder, cooling the extrudate product to obtain a cooled product and grinding the cooled product to obtain a further powder-form product.

17. A process according to claim 16 wherein the further powder is heated in the extruder at a temperature of from 180° C. to 240° C.

18. A process according to claim 16 further comprising combining the roast and ground extract powder-form product and the further powder-form product to obtain a combined product.

19. A process according to claim 16 further comprising, prior to drying the further extract, adding an oil to the further extract.

20. A process according to claim 19 further comprising, after adding the oil to the further extract, homogenizing the further extract and oil so that the oil in the further extract has a particle size of less than one micrometer.

21. A process according to claim 16 or 17 or 19 or 20 wherein the powder is heated in the extruder for up to 2 minutes.

22. A process according to claim 16 wherein the extrudate product is cooled upon exit from the extruder to preserve aroma and flavor components in the extrudate product.

23. A process according to claim 16 further comprising, prior to extracting the ground green coffee, steaming the ground green coffee.

24. A process according to claim 16 further comprising steaming green coffee beans to obtain steamed green coffee and wherein the ground green coffee extracted comprises the steamed green coffee.

25. The powder-form product of claim 16.

26. The combined product of the process of claim 18.

* * * * *